United States Patent
Tracy et al.

(10) Patent No.: US 6,204,297 B1
(45) Date of Patent: *Mar. 20, 2001

(54) NONIONIC GEMINI SURFACTANTS

(75) Inventors: David James Tracy; Ruoxin Li, both of Plainsboro; Manilal S. Dahanayake, Princeton Junction; Jiang Yang, Plainsboro, all of NJ (US)

(73) Assignee: Rhodia Inc., Cranbury, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/756,872

(22) Filed: Nov. 26, 1996

(51) Int. Cl.$^7$ .............................. B01F 17/42; C11D 1/72; C11D 1/83

(52) U.S. Cl. ............................ 516/76; 510/492; 568/22; 568/39; 568/46; 568/55

(58) Field of Search .............................. 252/351; 568/21, 568/39, 55, 45, 46, 22; 510/492; 516/76

(56) References Cited

U.S. PATENT DOCUMENTS

| | | | |
|---|---|---|---|
| 2,776,997 | * | 1/1957 | Doumani .................. 568/39 |
| 3,163,620 | * | 12/1964 | Von Brachel et al. ........... 568/45 |
| 3,627,845 | * | 12/1971 | Hickner et al. ............... 568/45 |
| 3,662,003 | * | 5/1972 | Umbach et al. ............... 516/76 |

(List continued on next page.)

FOREIGN PATENT DOCUMENTS

| | | |
|---|---|---|
| 43 21 022 | 6/1993 | (DE) . |
| 688781 | 12/1995 | (EP) . |

OTHER PUBLICATIONS

Allouch, et .al. Nonionic Amphiphilic Compounds From Aspartic and Glutamic Acids as Structural Mimics of Lecithins. JAOCS 73; No. 1 (1996) 87–95. Month Unknown.

(List continued on next page.)

Primary Examiner—Robert Dawson
Assistant Examiner—Daniel S. Metzmaier
(74) Attorney, Agent, or Firm—Waton & Kipnes, P.C.; John Daniel Wood

(57) ABSTRACT

Novel nonionic gemini surfactants are extremely effective emulsifiers for oil-in-water emulsions that provide improved detergency at even low concentration levels. The surfactants are characterized by the formula:

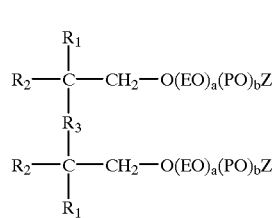

I.

wherein $R_1$ is independently H or a $C_1$ to $C_{22}$ alkyl, $R_2$ is H or $C_1$ to $C_{22}$ alkyl and R3 is $D_1$—$R_4$—$D_1$ or $R_4$—$D_1$—$R_4$ wherein $R_4$ is independently a $C_1$-$C_{10}$ alkyl group, —C(O)—, —$R_5[O(EO)_a(PO)_b]$—, —O—$R_5$—O—, or aryl, e.g. phenyl, and $D_1$ is independently —O—, —S—, —S—S—, —$SO_2$—, —C(O)—, a polyether group [—O$(EO)_a(PO)_b$—], an amide group [—C(O)N($R_6$)—], an amino group [—N($R_6$)—], —O—$R_5$—O—, or aryl. $(EO)_a(PO)_b$ is a polyether group and Z is a $C_1$-$C_4$ alkyl, or an alkylaryl or hydrogen wherein EO represents ethyleneoxy radicals, PO represents propyleneoxy radicals, a and b are numbers of from 0 to 100, a is preferably from about 0 to about 30 and b is preferably from about 0 to 10, wherein a plus b is at least one, and the EO and PO alkyl or alkylaryl.

6 Claims, 2 Drawing Sheets

U.S. PATENT DOCUMENTS

| | | | |
|---|---|---|---|
| 4,575,569 | * 3/1986 | Edwards | 568/45 |
| 4,836,951 | * 6/1989 | Totten et al. | 568/606 |
| 4,892,806 | 1/1990 | Briggs et al. | 252/357 |
| 5,403,922 | 4/1995 | Garelli-Calvet | 536/1.11 |
| 5,488,180 | 1/1996 | Jenkins et al. | 568/609 |
| 5,534,197 | 7/1996 | Scheibel et al. | 570/356 |
| 5,643,864 | * 7/1997 | Li et al. | 510/499 |
| 5,656,586 | * 8/1997 | Li et al. | 510/535 |
| 5,922,663 | * 7/1999 | Gabriel et al. | 516/76 |
| 5,922,671 | * 7/1999 | Tracy et al. | 510/467 |

OTHER PUBLICATIONS

Eastoe, et .al. Properties of New Glucamide Surfactants Langmuir 12 (1996) 2701–2705. Month Unknown.

Seguer, et .al., Nonionic Amphiphilic Compounds From Lysine as Molecular Mimics of Lecithins JAOCS 73 No. 1 (1996) 79–85. Month Unknown.

Zhang, et .al. Novel Polysaccharide Surfactants. The Effect of Hydrophilic and Hydrophobic Chain Length on Surface Active Properties J. Colloid Interface Sci. 177 (1996) 419–426. Month Unknown.

Andre–Barres, et .al. New Double Chain Surfactants Derived From Glucose and Lactose New J. Chem 19,, No. 4, (1995) 345–347. Month Unknown.

Briggs, et .al. Synthesis and Properties of Some Novel Nonionic Polyol Surfactants. J. Chem Soc., Chem. Commun. (1995) 379–380. Month Unknown.

Eastoe, et .al. Properties of a Dichained Sugar Surfactant Langmuir 10 (1994) 4429–4433. Month Unknown.

Seguer, et .al. New Nonionic Surfactants From Lysine and Their Performance J. Dispersion Sci. and Tech. 15; No. 5 (1994) 591–610. Month Unknown.

Latge, et .al. Synthesis of Long Chain N–Alkyllactamines From Unprotected Lactose: A New Series of Nonionic Surfactants J. Dispersion Sci. and Tech. 12; No. 3 (1991) 227–237. Month Unknown.

Micich, et .al. Wetting Properties of Nonionics From Branched Fatty Amides JAOCS 65 No. 5 (May 1988) 820–825.

Hjelmeland, et .al. A New Class of Nonionic Detergents With a Gluconamide Polar Group Anal.Biochem 130 (1983) 485–490. Month Unknown.

Emmerling, et .al. Preparative Methods for the Preparation of Higher Maltoligomers and Their Coupling with Aliphatic Diramines Starch 33 No. 6 (1981) 202–208. Month Unknown.

M. Rosen: Geminis: A New Generation of Surfactants Chemtech (3–93) 30–33.

Menger, et .al. Gemini Surfactants: A New Class of Self Assembling Molecules J. AM. Chem. Soc. 115 (1993) 10083–10090. Month Unknown.

Seki et .al. Characterization of the Complexes of Amphiphilic Polyanions and Double Chain Cationic Surfactants Macromolecules 25 (1992) 6540–6546. Month Unknown.

Menger, et .al. Gemini Surfactants: Synthesis and Properties J. AM. Chem. Soc. 113 (1991) 1451–1452. Month Unknown.

Tschierske, et .al. Novel Thermotrophic and Lyotropic Double Headed Diol–Based Mesogens, J. Chem. Soc., Chem. Commun. (1990) 1013–1014. Month Unknown.

Fuhrhop, et .al. Routes to Functional Vesicle Membranes Without Proteins Angew. Chem. Intl. Ed. Engl. 23 (1984) 100–113. Month Unknown.

Lin, I. Critical Micelle Concentration, Hydrophile Lipophile Balance, Etc. of Ionic Surfactants Containing Two Long Chain Alkyl Groups Tenside Detergents; 17 No. 3 (1980) 113–123. Month Unknown.

* cited by examiner

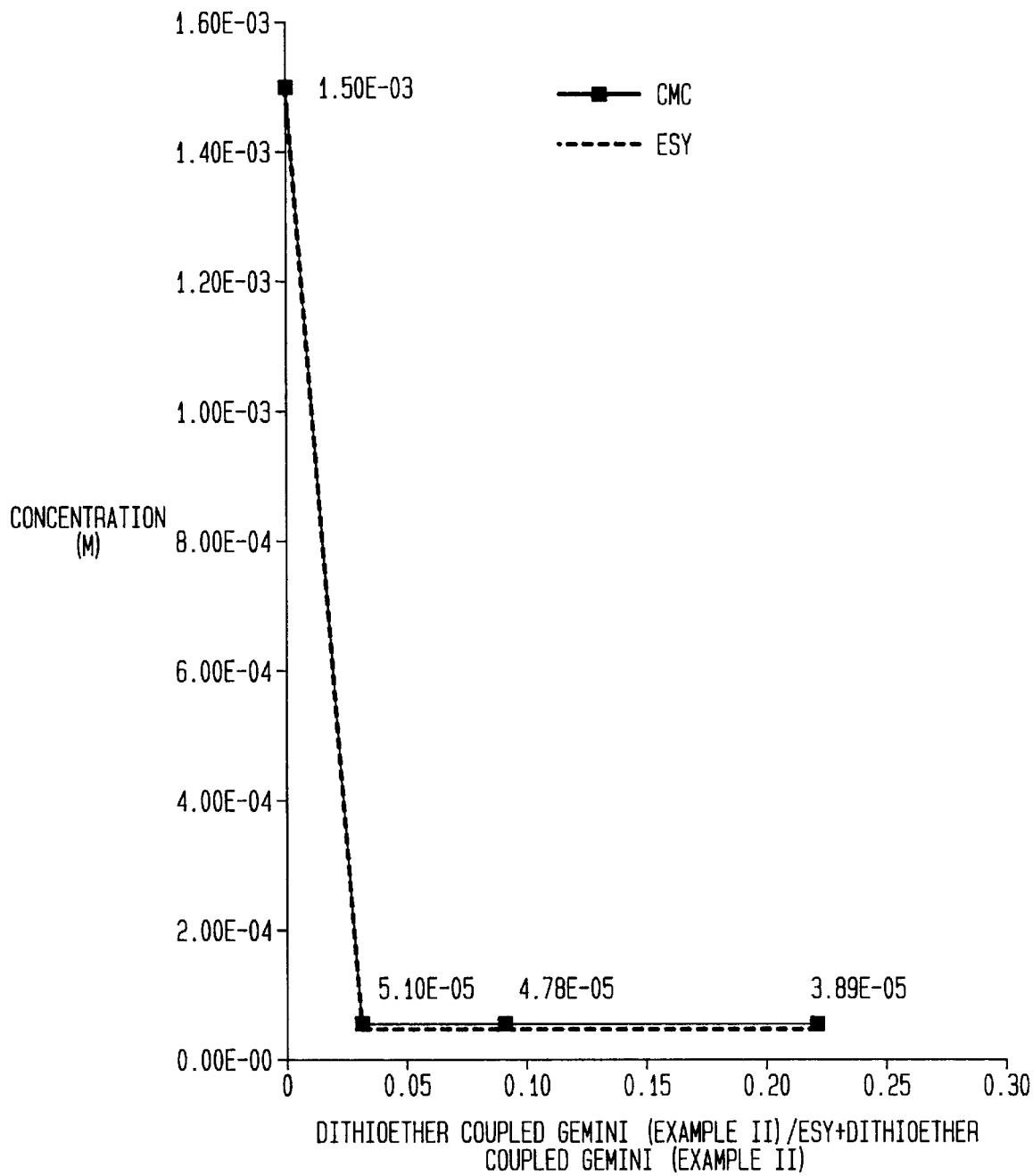

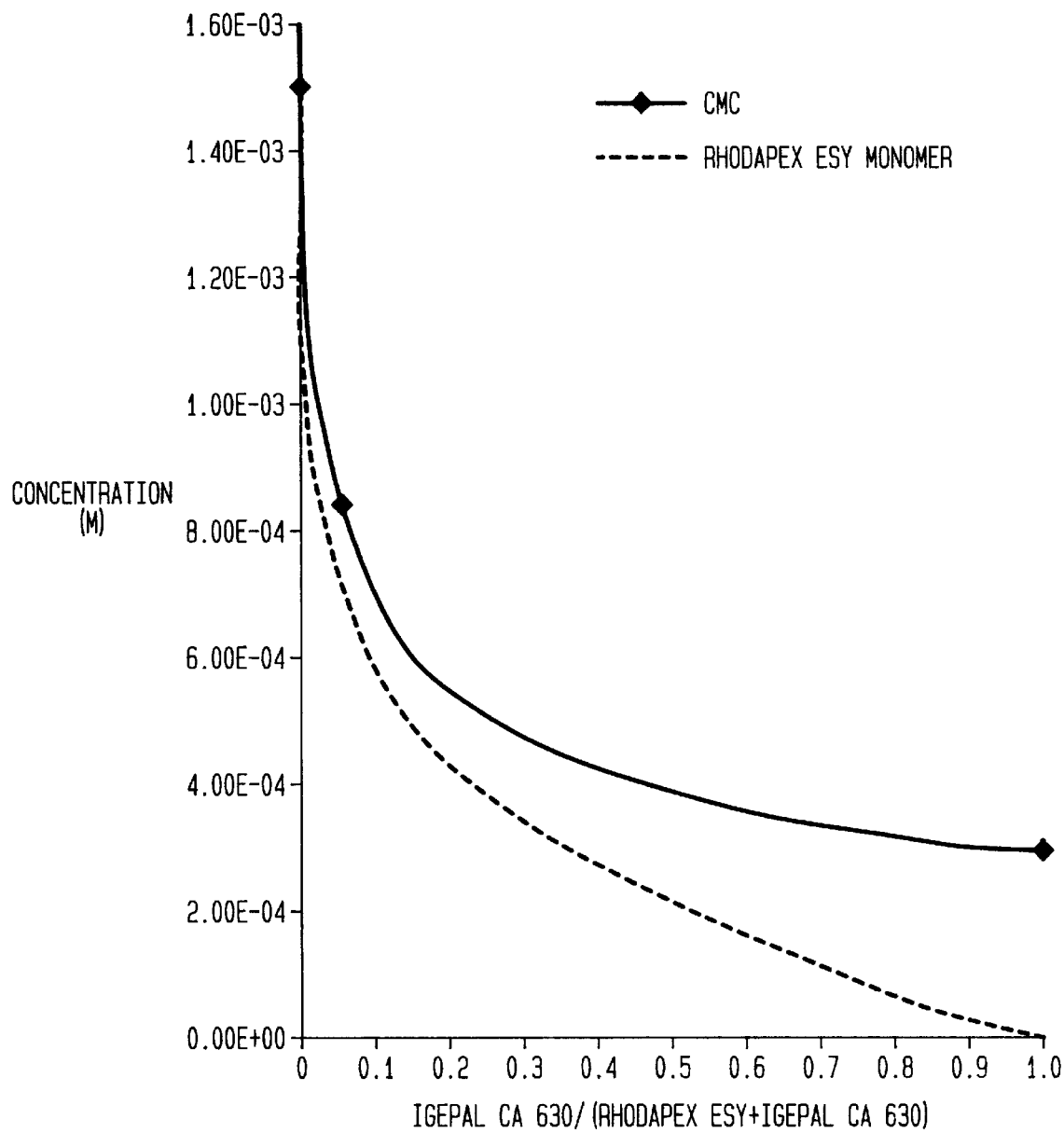

NONIONIC GEMINI SURFACTANTS

This invention relates to improved surfactants useful as emulsifiers and in detergents and personal care products at very low concentrations.

Emulsification is an extremely important technology and it is a process which is used in detergency, emulsion polymerization, cosmetics, food, agrochemicals, paints, paper, transportation of crude oil, etc. Emulsifiers function as essential ingredients in personal care and household products; industrial and institutional cleaners including shampoo, car washes, carpet shampoo, hand dishwashing liquids, latex foaming and oil recovery compositions; and the like.

In order to form a relatively stable emulsion, an emulsifier is required to adsorb at an oil-water interface to prevent emulsion droplet coalescence. The majority of emulsifiers are synthetic surfactants or natural products with amphiphilic character. Presently, usage levels of surfactants for effective emulsification are usually above 0.1% active based on the total weight of the detergent solution which is used in the final use composition. For a given emulsifier system, it would be advantageous to use a lower amount of surfactant to reduce the cost and amount of surfactant waste discharged into the environment; and to improve the performance of final products (e.g., the film forming and water resistance will be improved in latex paints and skin irritation will be reduced for cosmetic products).

While conventional surfactants generally have one hydrophilic group and one hydrophobic group, recently a class of compounds having at least two hydrophobic groups and at least two hydrophilic groups have been introduced. These have become known as "gemini surfactants" in the literature (*Chemtech*, March 1993, pp 30–33), and *J. American Chemical Soc.*, 115, 10083–10090, (1993) and the references cited therein). Other gemini surfactant compounds, that is, compounds having at least two hydrophilic groups and at least two hydrophobic groups are also disclosed in literature but often are not referred to expressly as gemini surfactants.

An intensive study of gemini surfactants as emulsifiers has been made. From these studies, it has been found that gemini surfactants are unexpectedly effective emulsifiers when used at very low concentrations in comparison to conventional surfactants. This finding is reflected in superior detergency at very low concentrations. Other performance properties related to emulsification as mentioned above can be also improved using low concentrations of gemini surfactants.

SUMMARY OF THE INVENTION

In accordance with the present invention, it has been discovered that gemini surfactants of the type described and claimed herein can be extremely effective emulsifiers for oil-in-water emulsions at lower concentrations than that needed utilizing corresponding conventional surfactants. Furthermore, the detergency is also improved over that provided by conventional surfactants at these low concentration levels. These novel gemini surfactants are also able to lower the monomer concentration of anionic surfactants when the two are mixed in a blend. This results in less skin irritation and the other toxic side effects of anionics.

DETAILED DESCRIPTION OF THE DRAWINGS

FIG. 1 is a graph of the reduction in the monomer concentration of a conventional anionic surfactant, sodium lauryl ether sulfate, shown as a function of the monomer concentration versus the concentration of an added dithioether-coupled gemini surfactant of the invention.

FIG. 2 is a graph of the reduction in the monomer concentration of a conventional anionic surfactant, sodium lauryl ether sulfate, shown as a function of the monomer concentration versus the concentration of an added conventional nonionic surfactant, octylphenol ethoxylate (Igepal CA 630).

DETAILED DESCRIPTION OF THE INVENTION

The novel surfactant compounds of the invention are based on certain gemini surfactants. As used herein, the term "gemini surfactants" is intended to mean surfactants having at least 2 hydrophobic groups and at least 2 hydrophilic groups per molecule.

A number of the gemini surfactant are reported in the literature, see for example, Okahara et al., J. Japan Oil Chem. Soc. 746 (Yukagaku) (1989); Zhu et al., 67 JAOCS 7,459 (July 1990); Zhu et al., 68 JAOCS 7,539 (1991); Menger et al., J. Am. Chemical Soc. 113, 1451 (1991); Masuyama et al., 41 J. Japan Chem. Soc. 4,301 (1992); Zhu et al., 69 JAOCS 1,30 (Jan. 1992); Zhu et al., 69 JAOCS 7,626 July 1992); Menger et al., 115 J. Am. Chem. Soc. 2, 10083 (1993); Rosen, Chemtech 30 (March 1993); and Gao et al., 71 JAOCS 7,771 (July 1994), all of this literature incorporated herein by reference.

Also, gemini surfactants are disclosed by U.S. Pat. No. 2,374,354, Kaplan; U.S. Pat. No. 2,524,218, Bersworth; U.S. Pat. No. 2,530,147 Bersworth (two hydrophobic tails and three hydrophilic heads); U.S. Pat. No. 3,244,724, Guttmann; U.S. Pat. No. 5,160,450, Okahara, et al., all of which are incorporated herein by reference.

The gemini surfactants may be anionic, nonionic, cationic or amphoteric. The hydrophilic and hydrophobic groups of each surfactant moiety may be any of those known to be used in conventional surfactants having one hydrophilic group and one hydrophobic group. For example, a typical nonionic gemini surfactant, e.g., a bis-polyoxyethylene alkyl ether, would contain two polyoxyethylene alkyl ether moieties. However, non-ionic gemini surfactants prior to this are extremely rare.

Gemini surfactants are relatively quite new and few species have been reported or disclosed in the prior art. U.S. Pat. No. 5,534,197 to Scheibel teaches a method for the preparation of a nonionic gemini surfactant wherein the hydrophilic head is a sugar or carbohydrate while the hydrophobic head is a long chain alkyl, the two joined by a short alkyl chain. U.S. Pat. Nos. 3,888,797 and 3,855,156, both to Marumo, disclose a number of nonionic gemini surfactant species in which the hydrophobic portion is comprised of a long chain lower alkyl or alkene while the hydrophilic portion is comprised of an ethoxylate group. U.S. Pat. No. 4,892,806 to Briggs and EP 0,688,781A1 to Adams also disclose sugar-based hydrophilic heads joined to the hydrophobic counterpart by a short chain carbon bridge.

Each moiety would contain a hydrophilic group, e.g., polyoxyethylene, and a hydrophobic group, e.g., an alkyl chain.

Nonionic gemini surfactants which are useful in the present invention include those of the formula:

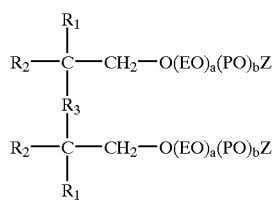

wherein $R_1$ is independently H or a $C_1$ to $C_{22}$ alkyl, $R_2$ is H or $C_1$ to $C_{22}$ alkyl and $R_3$ is —C(O)—, S, $SO_2$, S—S or $D_1$—$R_4$—$D_1$ or $R_4$—$D_1$—$R_4$ wherein $R_4$ is independently a $C_1$-$C_{10}$ alkyl group, —C(O)—, —$R_5[O(EO)_a(PO)_b]$—, —O—$R_5$—O—, or aryl, e.g. phenyl, and $D_1$ is independently —O—, —S—, —S—S—, —$SO_2$—, —C(O)—, a polyether group [—$O(EO)_a(PO)_b$—], an amide group [—C(O)N($R_6$)—], an amino group [—N($R_6$)—], —O—$R_5$—O—, or aryl, $(EO)_a(PO)_b$ is a polyether group and Z is a $C_1$-$C_4$ alkyl, or an alkylaryl or hydrogen. When $D_1$ is an amino group, then $R_6$, $R_4$, and $D_1$ can be part of a heterocyclic ring. $R_5$ and $R_6$ are a $C_1$ to $C_{10}$ alkyl, aryl, or alkylaryl.

Wherein EO represents ethyleneoxy radicals, PO represents propyleneoxy radicals, a and b are numbers of from 0 to 100, a is preferably from about 0 to about 30 and b is preferably from about 0 to 10, wherein a plus b is at least one, and the EO and PO radicals can be randomly mixed or in discrete blocks.

With respect to the formulae of this disclosure, the term "alkyl" includes substituted alkyl, especially the hydroxy substituted derivatives thereof and also straight as well as branched chains. When Z is hydrogen, the gemini surfactants are nonionic and, when Z is a $C_1$ to $C_4$ alkyl, or an alkylaryl, they become low foaming nonionics.

The compounds of Formula I are more fully described in U.S. Pat. No. 5,643,864 issued Jul. 1, 1997, the entire disclosure of which is incorporated herein by reference.

Particular gemini surfactants specifically useful in the present invention include nonionic surfactants of the formulae:

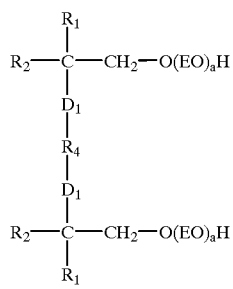

wherein $R_1$ represents H or is a $C_1$ to $C_{22}$ alkyl or aryl, $R_2$ is a $C_1$ to $C_{22}$ alkyl or aryl, a and $R_4$ have been hereinbefore defined and $D_1$ is O, S, or N—$R_6$ wherein $R_6$ is $C_1$-$C_{10}$ alkyl, aryl or alkylaryl.

Preferably, the nonionic gemini surfactants that are useful in the practice of the present invention are selected from the following structures:

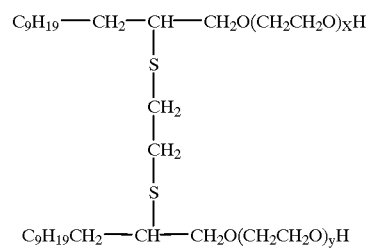

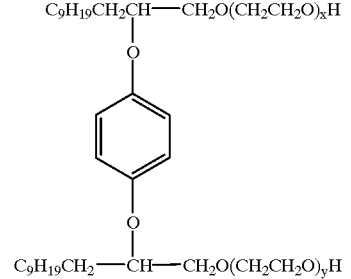

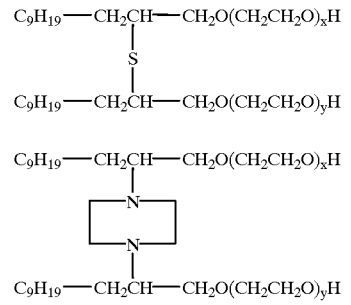

The gemini surfactants corresponding to the general formula II can be prepared using the following basic series of reactions:

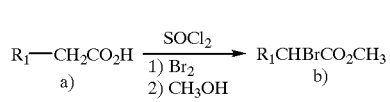

The synthesis of α-halo acids is well known in the art; see for example Org. Syn. Coll. III p. 523; 848 which is hereby incorporated by reference.

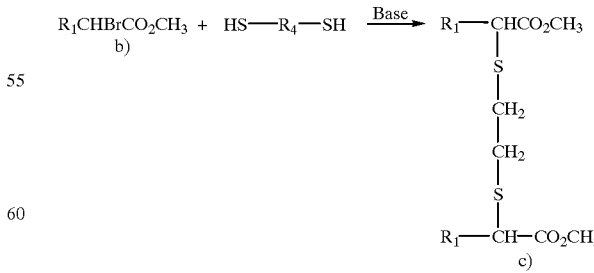

wherein $R_4$ is independently a $C_2$-$C_{22}$ alkyl, aryl or alkylaryl. The coupled ester is then reduced and ethoxylated as follows:

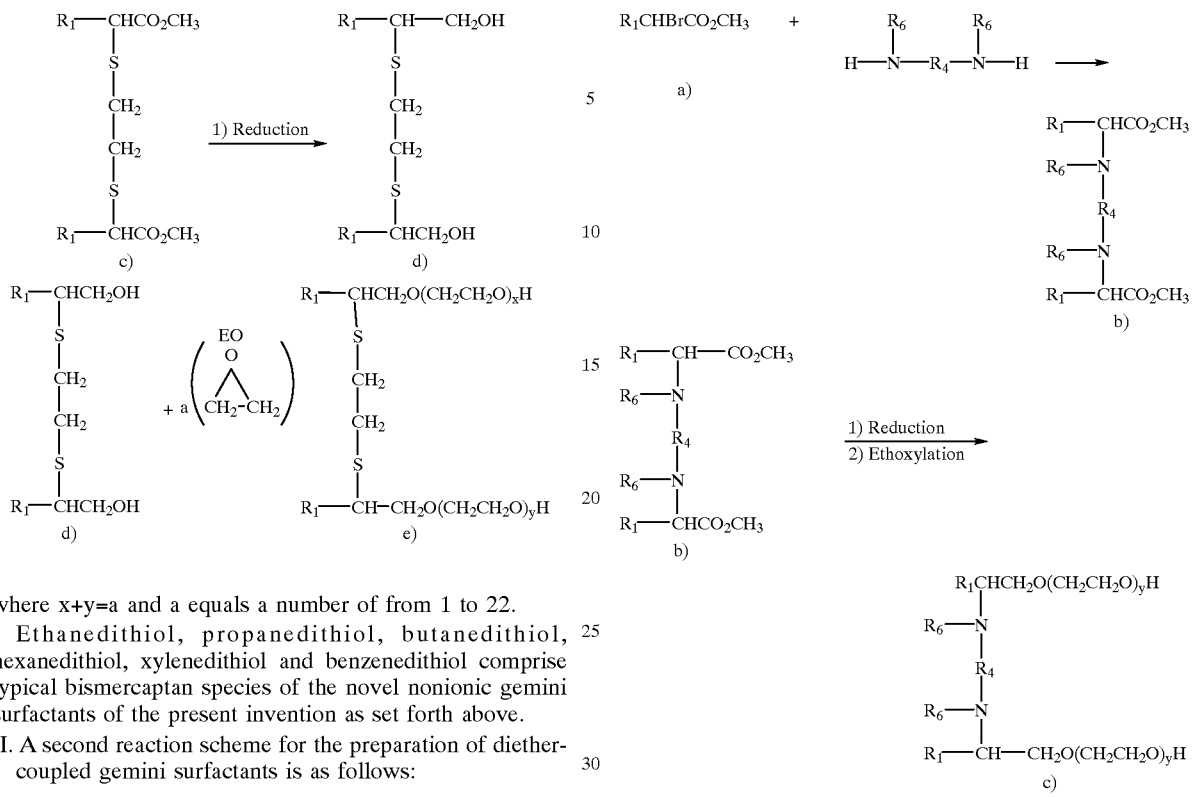

where x+y=a and a equals a number of from 1 to 22.

Ethanedithiol, propanedithiol, butanedithiol, hexanedithiol, xylenedithiol and benzenedithiol comprise typical bismercaptan species of the novel nonionic gemini surfactants of the present invention as set forth above.

II. A second reaction scheme for the preparation of diether-coupled gemini surfactants is as follows:

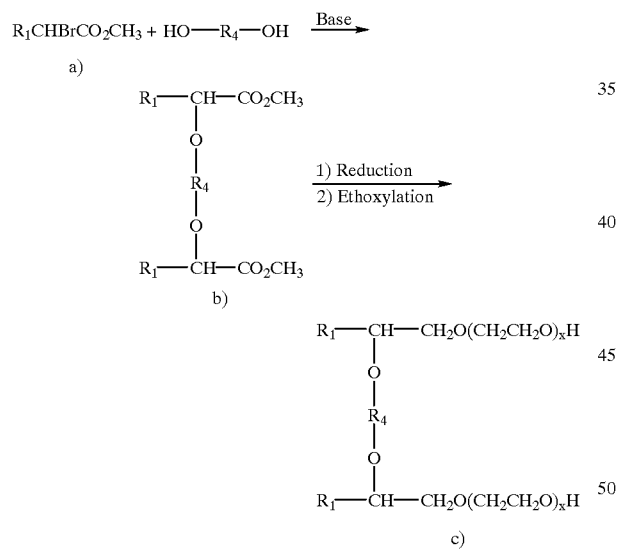

where $R_1$ is independently H or $C_1$–$C_{22}$ alkyl, aryl, or alkylaryl and x are numbers of from 1–12. $R_4$ is independently any $C_1$–$C_{22}$ alkyl, aryl, or alkylaryl. Typical gemini nonionic-coupling diols include ethylene glycol, propylene glycol, butylene glycol, diethylene glycol, hexylene glycol, hydroquinone, xylenediol and the like.

III. Amine-coupled nonionic gemini surfactants are also useful according to the practice of the present invention and may be synthesized as follows:

wherein $R_1$, $R_4$ and $R_6$ are hereinbefore defined and y is a number from 1 to 12. Typical amine nonionic gemini surfactants useful in the present invention comprise piperazine, methylamine; $N,N^1$ dimethylethylenediamine, xylenediamine, $N,N^1$ dimethylbutanediamine, $N,N^1$ dimethylbutenediamine and $N,N^1$ dimethyl-1, 6-hexanediamine and urea.

IV. Novel nonionic gemini surfactants with low foaming characteristics may be prepared by the following reaction schemes:

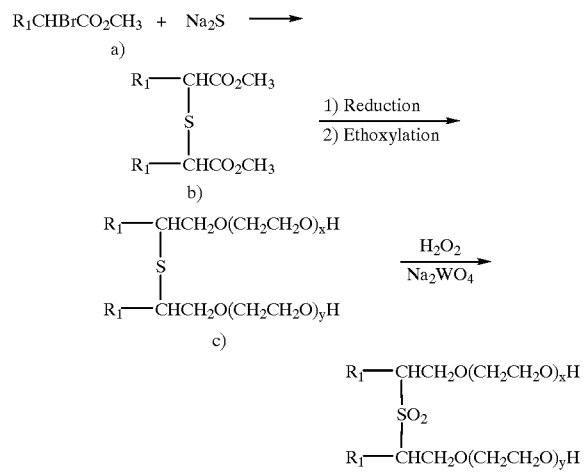

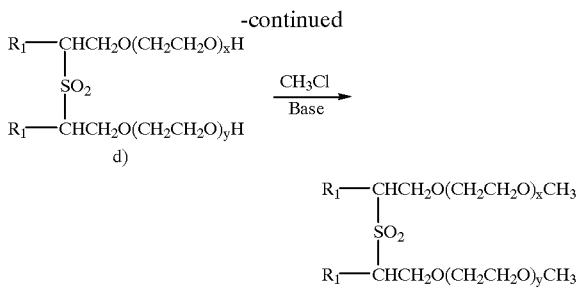

The compounds of Formula I and II are more fully described in copending application U.S. Ser. No. 60/009,075 filed Dec. 21, 1995, now U.S. Pat. No. 5,710,121, the entire disclosure of which is incorporated herein by reference.

This class of gemini surfactants as disclosed in the present invention can be used in providing improved emulsions which are operable at lower concentrations than the known surfactants of the prior art.

In the compounds used in the invention, many of the moieties can be derived from natural sources which will generally contain mixtures of different saturated and unsaturated carbon chain lengths. The natural sources can be illustrated by coconut oil or similar natural oil sources such as palm kernel oil, palm oil, soya oil, rapeseed oil, castor oil or animal fat sources such as herring oil and beef tallow. Generally, the fatty acids from natural sources in the form of the fatty acid or the triglyceride oil can be a mixture of alkyl radicals containing from about 5 to about 22 carbon atoms. Illustrative of fatty acids are caprylic ($C_8$), capric ($C_{10}$), lauric ($C_{12}$), myristic ($C_{14}$), palmitic ($C_{16}$), stearic ($C_{18}$), oleic ($C_{18}$, monounsaturated), linoleic ($C_{18}$, diunsaturated), linolenic ($C_{18}$, triunsaturated), ricinoleic ($C_{18}$, monounsaturated) arachidic ($C_{20}$), gadolic ($C_{20}$, monounsaturated), behenic ($C_{22}$) and erucic ($C_{22}$). These fatty acids can be used per se, as concentrated cuts or as fractionations of natural source acids. The fatty acids with even numbered carbon chain lengths are given as illustrative though the odd numbered fatty acids can also be used. In addition, single carboxylic acids, e.g., lauric acid, or other cuts, as suited for the particular application, may be used as well as acids derived from Guerbet alcohols.

Where desired, the surfactants used in the present invention can be oxyalkylated by reacting the product with an alkylene oxide according to known methods, preferably in the presence of an alkaline catalyst.

For alkylation conditions and commonly used alkylating agents, see Amphoteric Surfactants Vol. 12, Ed. B. R. Bluestein and C. L. Hilton, *Surfactant Science Series* 1982, pg. 17 and references cited therein, the disclosures of which are incorporated herein by reference.

The surfactant compositions comprising the gemini nonionic compounds of the invention are extremely effective in aqueous solution at low concentrations as defined herein. The surfactants of the invention can be used in any amount needed for a particular application which can be easily determined by a skilled artisan without undue experimentation.

While the gemini surfactants of the invention can be used alone, it has been unexpectedly found that blends of the compounds of the invention with certain other conventional well known anionic, nonionic, cationic and amphoteric surfactants as well as polymers and enzymes provide synergistic effects in relation to critical micelle concentration (cmc) and surface tension reducing ability, and hence improved detergency.

Another important unexpected property of the Gemini Surfactants is their ability to significantly lower the ionic monomer concentration in mixtures of anionic/nonionic or anionic/nonionic/amphoteric or anionic/nonionic/cationic surfactant mixtures. It is well know that anionic monomers that are useful in personal care systems are responsible for higher toxicity and skin irritancy. Further, anionic surfactant monomers are responsible for the deactivation of enzymes used in detergent systems and moreover, being anionic, they interact strongly with proteins and enzymes thereby deactivating them. Also anionic surfactants very often absorb onto polymers used in detergents, wastewater treatment systems and conditioning agents used in personal care applications and so on, thereby changing the charged nature of such polymers. This results in the complete loss or poor performance for the polymers in their application.

As shown in FIG. 1, the use of gemini surfactants in very small amounts in the presence of an anionic surfactant such as lauryl ether sulfate (ESY) dramatically reduces the anionic monomers. With the addition of less than a 0.1 mole fraction of the gemini surfactant, the anionic concentration in the mixture is brought down by greater than an order of magnitude of ten. This dramatic reduction of the anionic monomer at these very low concentrations will result in the elimination of any detrimental effects discussed above and brought about as a result of the anionic monomers. Therefore, this ability to decrease the anionic (or cationic) monomers in solution should provide performance enhancement for the surfactant or the surfactant polymer/enzyme mixtures and the other performance additives very often found in detergents, and personal care formulations.

The following examples are provided to more fully disclose, describe and set forth the elements and embodiments of the surfactants of the present invention. They are for illustrative purposes only, and it is recognized that minor changes or alterations may be made to the reaction parameters, reactants and isolation procedures that are not disclosed herein. However, to the extent that any such changes do not materially alter the final product or result, such alternative measures are deemed as falling within the spirit and scope of the invention as recited by the claims that follow.

EXAMPLE I

Preparation of Hydroquinone-coupled Gemini Structure IV

A. Preparation of α-Bromolauric Acid Methyl Ester 1

Initially, α-Bromolauric acid methyl ester was prepared as follows. Pure lauric acid (100 g, 0.5 mol) was dissolved in thionyl chloride (89 g, 0.75 mol) at 55° C. under nitrogen. A large amount of hydrogen chloride gas was generated. When all the lauric acid was converted to acid chloride and there was no more HCl gas being generated after stirring for 2.5 hours, bromine (89.25 g, 0.65 mol) was slowly added to the solution at room temperature. The reaction mixture was stirred for another 8 hours at 45° C. The reaction was then stopped by evaporating additional bromine at 80° C. by bubbling in nitrogen. The crude product, α-bromolauric acid chloride, was cooled to 0° under nitrogen. Pure methanol was then added very slowly to the acid chloride solution at 0° C. The temperature was not allowed to exceed 15° C. during this process. The final crude product, α-bromolauric acid methyl ester, was washed with water several times. The final product was extracted twice with hexane. The NMR results showed that the product was completely pure. The yield of the reaction was about 98% and may be summarized as follows:

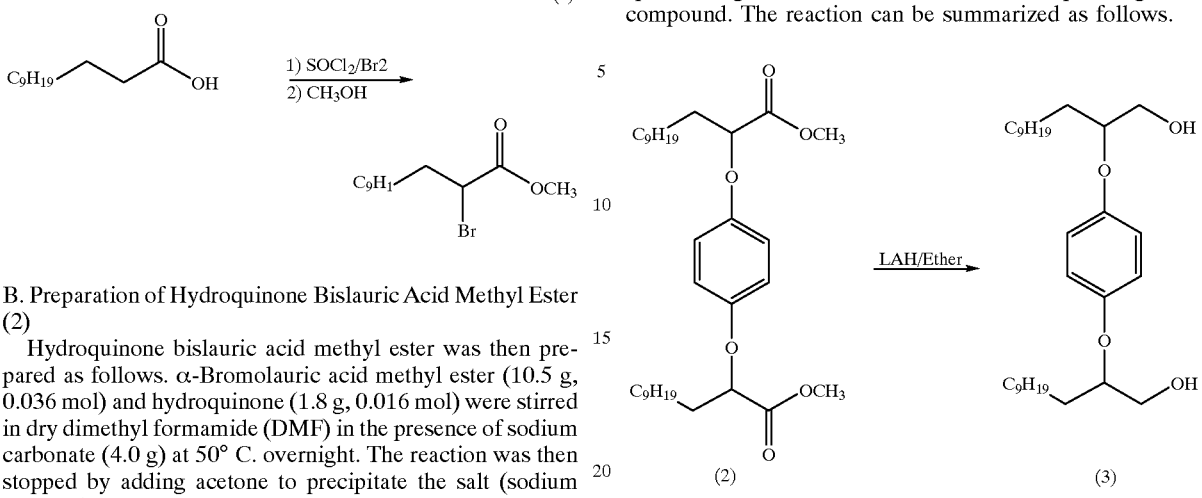

B. Preparation of Hydroquinone Bislauric Acid Methyl Ester (2)

Hydroquinone bislauric acid methyl ester was then prepared as follows. α-Bromolauric acid methyl ester (10.5 g, 0.036 mol) and hydroquinone (1.8 g, 0.016 mol) were stirred in dry dimethyl formamide (DMF) in the presence of sodium carbonate (4.0 g) at 50° C. overnight. The reaction was then stopped by adding acetone to precipitate the salt (sodium bromide) which was separated by filtration. The organic layer was collected and then rotovaporated. In order to remove the excess starting material, the crude product was stripped at 150° C. under reduced pressure for an hour. The final remaining product was immediately analyzed by NMR. The NMR spectrum showed that the crude product (6.5 g) was at least 95% pure. The reaction may be structurally summarized as follows:

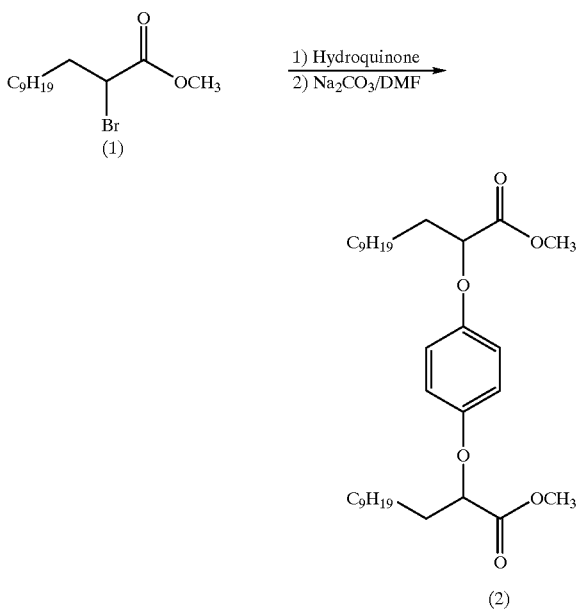

C. Preparation of Hydroquinone Bislauryl Alcohol (3)

The desired nonionic gemini surfactant, hydroquinone bislauryl alcohol was prepared as follows. Hydroquinone bislauric acid methyl ester (5.25 g) was dissolved in dry tetrahydrofuran (THF) at 0° C. Lithium aluminum hydride (LAH) (1.07 g) was added to the solution slowly. A large amount of hydrogen was generated. The reaction temperature was then raised to 25° C. After the reaction was stirred for an hour at this temperature, the reaction was stopped by adding ethanol to deactivate the excess LAH. The solution was mixed with water and then acidified with concentrated HCl. The final product was extracted twice with ether. The crude hydroquinone bislauryl alcohol was dried under vacuum. The product is an oily liquid (4.2 g) whose NMR spectrum agrees with the structure of the expected gemini compound. The reaction can be summarized as follows.

D. Preparation of Ethoxylated (20 EO) Hydroquinone Bislauryl Alcohol (Structure IV).

478 g (1 mol) of hydroquinone bislauryl alcohol and 0.5 g of potassium hydroxide were added to a 2 gal. autoclave. The autoclave was degassed by pulling vacuum and releasing with nitrogen. The autoclave was heated to 140° C. and ethylene oxide (2 to 3 mols) was added rapidly allowing temperature to exotherm to 150–160° C. The remaining ethylene oxide (880 gm total) was added to a maximum of 53 psig. After 30 minutes of constant pressure and the weighed amount of ethylene oxide is added, the autoclave is cooled to 120° C. and vacuum stripped with a slight nitrogen sparge for 20 minutes. Finally, after cooling, acetic acid was added to lower the system to a pH 7. Analysis by NMR indicated that 20 mols EO were reacted.

EXAMPLE II
Preparation of Dithioether-Coupled Gemini III

A second nonionic gemini surfactant, ethoxylated ethylene dithio-bislauryl alcohol was prepared. First, the α-bromolauric acid methyl ester was prepared as in Example I.

A. Preparation of Dithio-Coupled Ester (4)

α-bromolauric acid methyl ester (15 g), ethylenedithiol (1.9 ml) and sodium carbonate (4.9 g) were stirred together in dry DMF. After the reaction was carried out under argon at 60° C. for 22 hours, it was stopped by cooling down to room temperature. The inorganic salt was separated by filtration. The organic portion was collected. DMF solvent and the excess amount of α-bromolauric acid methyl ester were distilled out at 190° C. (external temperature) under vacuum. This took about 30 minutes. The remaining material, a yellow liquid, was immediately analyzed by NMR. Both $^1$H-NMR and $^{13}$C-NMR spectra agreed with the expected structure of the final product. The reaction scheme may be summarized as follows.

B. Preparation of Ethylenedithio-Bislauryl Alcohol (5)

Ethylenedithio-bislauryl alcohol was prepared as the final intermediate as ethylenedithio-bislauric acid methyl ester (8 g) was dissolved in dry THF at 0° C. (ice bath). Lithium aluminum hydride (1.16 g) was added to the flask slowly. Hydrogen was generated, and the reaction temperature was gradually raised to 30° C. After stirring for 4 hours, the reaction was quenched by pouring the solution thus formed into ice water. The aqueous solution was neutralized by adding concentrated HCl, and the crude product was then extracted with ethyl acetate three times. After evaporating the solvents, the compound (7.0 gm) was dried under vacuum and analyzed by NMR. NMR data agrees with the expected structure of the final product as set forth in the reaction summary below.

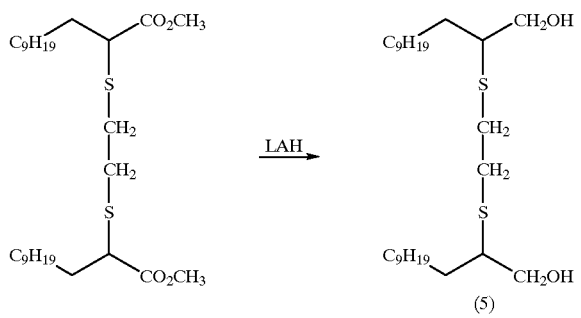

(5)

C. Preparation of Dithio-Coupled Gemini III

Finally, ethoxylated ethylenedithio-bislauryl alcohol was prepared by mixing potassium hydroxide flakes (0.545 g) in melted ethylenedithio-bislauryl alcohol (462 g) in a two-gallon autoclave under nitrogen. The reactor was then degassed and the autoclave heated to 140° C. Ethylene oxide (2.0–3.0 mols) was added quickly allowing for reaction kick. Additional ethylene oxide (704 gm total) was added at 150–160° C. and 90 psig. for 30 minutes. When the pressure remained constant, the reaction was cooled to 120° C. and vacuum stripped with a slight nitrogen sparge for 20 minutes. Finally, acetic acid was added to a pH of 7.0 in order to neutralize the potassium hydroxide. NMR analysis indicated the reaction produced 16 mols of ethoxylated ethylenedithio-bislauryl alcohol which had a cloud point (1.0% in $H_2O$) of 69° C. The reaction scheme may be structurally summarized as follows.

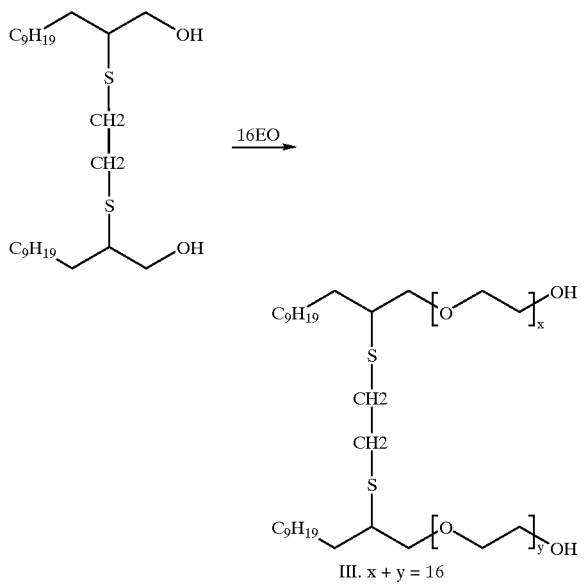

III. x + y = 16

EXAMPLE III
Preparation of Thiobis Gemini V
A. Preparation of Thiobislauric Ester (6)

To α-bromolauric acid methyl ester (10.5 g., 0.036M) and sodium sulfide monohydrate (2.93 g; 0.012 m) were refluxed in methanol for 6 hours. After stirring for 20 minutes, the reaction solution readily became cloudy. The reaction was then stopped by cooling to room temperature and pouring into water. The crude product was extracted twice with ether. After removing the organic solvent by rotoevaporating, the remaining material was stripped under reduced pressure at 180° C. to remove trace amounts of the starting material. NMR results agree with the expected structure of the product. The yield of final product was 9.4 (based on amount of sodium sulfide). The reactants and products may be summarized as follows.

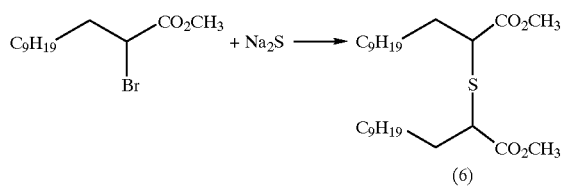

(6)

B. Preparation of Thiobislauryl Alcohol (7)

To 9.2 g (0.02 mole) of thiobislauric ester (6) in 50 ml THF, 1.70 g (0.045M) lithium aluminum hydride was slowly added at a temperature of 10° C. The reaction was then allowed to warm slowly to room temperature. The reaction was quenched by pouring the mixture into ice water and neutralizing with HCl. After extraction with ethylacetate (3×) and concentration, the alcohol was isolated (7.5 g). The NMR spectrum of the resulting compound agrees with that of structure (7) which may be summarized as follows.

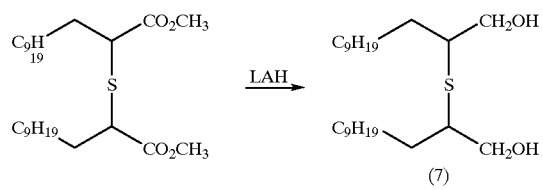

(7)

C. Preparation of Thiobis Ethoxylate V

To 402 g (1 mole) of the thiobis lauryl alcohol (7) 1.0 mole of potassium hydroxide and 30 moles ethylene oxide (1320 g) was added. The alcohol was heated to 140° C., purged with nitrogen and ethoxylated by adding 1320 g of ethylene oxide at 90 psig and 150° C. The product was isolated after neutralization of the base with acetic acid. The NMR spectrum indicates that 30 moles of ethylene oxide were reacted resulting in the following product.

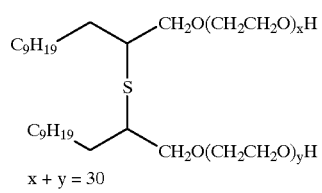

x + y = 30

EXAMPLE IV
Preparation of Piperazine Coupled Gemini VI
A. Preparation of Piperazine Coupled Ester (8)

α-Bromolauric acid methyl ester (24.1 g, 0.082 m) was added to 2.8 g (0.03 m) piperazine dissolved in DMF at 50° C. Sodium carbonate (8 g) was also then added to the solution. After stirring at 94° C. for 12 hours under nitrogen, the reaction was stopped by cooling to room temperature.

The inorganic salt was separated by filtration. The organic layer was stripped by distillation under reduced pressure at 180° C. The remaining material was analyzed by NMR. The NMR spectrum results agree with the expected structure of the final product. The yield of product was 14.5 g (94%). The reaction may be structurally summarized as follows:

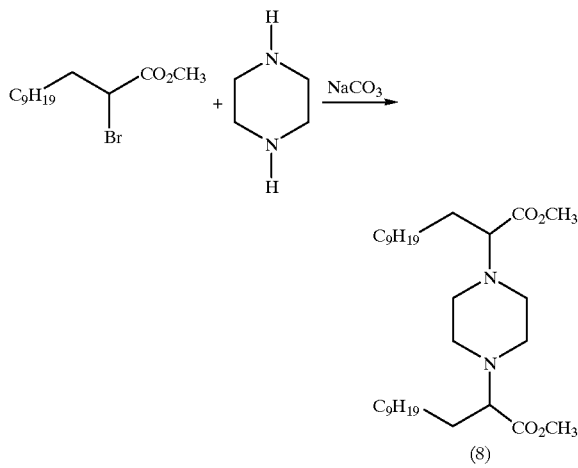

B. Preparation of Piperazine Coupled Laurylalcohol (9)

To 10.2 g (0.02 m) of the piperazine coupled lauryl ester (8) (10.2 g; 0.02 m) dissolved in 50 ml THF 1.7 g (0.045 m) lithium aluminum hydride was added slowly at 10° C. The reaction was allowed to warm to room temperature. The reaction was quenched by drowning the mixture in water and adjusting the pH to 10. After extraction with ethyl acetate and concentration, the product (8.2 g) was isolated. The NMR spectrum agrees with the expected structure. Infrared spectroscopy spectra shows the absence of any carbonyl bonds. The reaction may be summarized as follows.

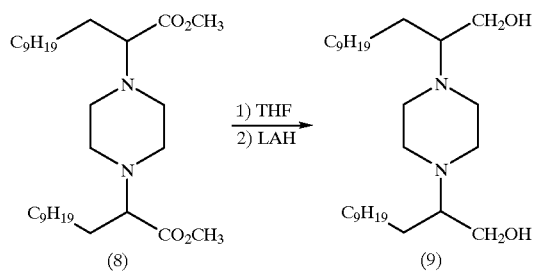

C. Preparation of Piperazine Coupled Ethoxylate VI

Potassium hydroxide (1 g) was added to 454 g (1.0 m) piperazine-coupled lauryl alcohol (9) followed by the addition of 50 moles of ethylene oxide (2200 g). The reactor was heated to 50° C. and more ethylene oxide was added at 55 psig until another 2200 g is added. The reaction is cooled and then neutralized with acetic acid. The NMR spectrum indicates addition of 50 moles ethylene oxide. The compound may be structurally represented as follows.

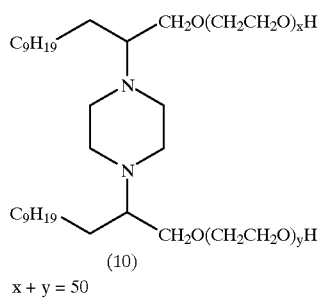

$x + y = 50$

EXAMPLE V

Oil-in-water emulsions were prepared using mineral oil/vegetable oil blends (1:1 wt ratio) in water in a 40/60 wt ratio, respectively. The emulsions were created by mechanically homogenizing the mixture and different levels of the nonionic gemini surfactant ethoxylated ethyldithio-bislauryl alcohol from Example II.

The compound from example II (0.1% w/w to 3.0% w/w) was added thereto. This was compared to the functionality of a conventional nonionic surfactant (Alcodet SK; $C_{12}H_{25}S(CH_2CH_2O)_8H$) at the same levels. All the surfactant emulsions created foams which continued creaming for three (3) days. The stability of each emulsion was then measured and compared by the amount of oil that coalesced in the foaming layer. Whereas no significant difference in emulsion stability was found with respect to the surfactants at the higher concentrations, i.e. >1.0% w/v, the nonionic gemini surfactant of Example II, showed significant superiority over the conventional nonionic surfactant at very low levels of 0.1% w/v. At these low concentrations, wherein no oil coalescence was found after three days for the surfactants of the present invention yet there was 50% oil coalescence found for the nonionic Alcodet SK surfactant samples after three days.

EXAMPLE VI

Surface Activity

The gemini surfactants of the present invention are more surface active than conventional lauryl alcohol ether nonionic surfactants having one hydrophobic and one hydrophile.

| Example: | | cmc (M) | γ cmc (dyne/cm) | Area $A^{o2}$ |
|---|---|---|---|---|
| 1) | II | $1.9 \times 10^{-5}$ | 32.7 | 107 |
| 2) | $C_{12}H_{25}O(EO)_8H$ | $1.1 \times 10^{-4}$ | 34.8 | — |

Example II shows a 10 fold lower cmc compared to a conventional surfactant.

EXAMPLE VII

Monomer Concentration

Products of invention are extremely efficient at lowering the monomer concentration of anionic surfactants in solution. This is demonstrated by FIG. 1 which shows that when the dithioether coupled gemini surfactant of Example II (0.03 mole fraction) was mixed in an aqueous solution of a conventional anionic surfactant (sodium lauryl ether sulfate), the free monomer concentration of the anionic surfactant was reduced from 1.5×10⁻3 to 0.5×10⁻4. This is a clear reduction in the detrimental effects (harshness, irritancy) of the anionic surfactants while also showing enhanced detergency and emulsification properties. This is in contrast to the results shown in FIG. 2 employing a known, conventional nonionic surfactant, octyl phenol ethoxylate, in place of the dithioether-coupled gemini of Example II which shows a far less reduction in the free monomer concentration.

What is claimed is:

1. A compound or composition of matter comprising one or more nonionic gemini compounds of the formula:

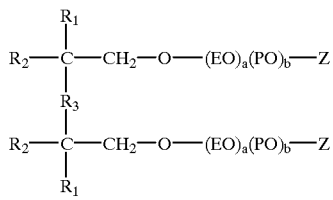

wherein $R_1$ is independently H or a $C_6$ to $C_{22}$ alkyl or aryl; $R_2$ is a $C_6$ to $C_{22}$ alkyl or aryl; $R_3$ is S, S—S, $D_1$—$R_4$—$D_1$— wherein $R_4$ is independently a $C_1$–$C_{10}$ alkylene group or arylene group and $D_1$ is independently —S— or —S—S—; $(EO)_a(PO)_b$ is a polyether group wherein EO represents ethylene oxide and PO represents propylene oxide, Z is a hydrogen and wherein a and b are whole integers of from 0 to 100 and a plus b is at least 1.

2. The compound or composition of claim 1 further comprising the structure:

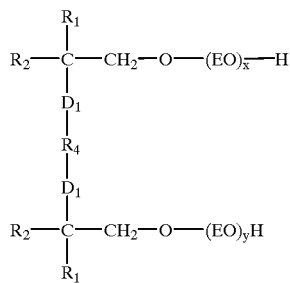

where $R_1$ is independently H or a $C_6$ to $C_{22}$ alkyl or aryl; $R_2$ is $C_6$ to $C_{22}$ alkyl or aryl; $R_4$ and EO have been hereinbefore defined and $D_1$ is S and x+y is a number between 2 and 200.

3. The compound or composition of claim 2 further comprising the structure:

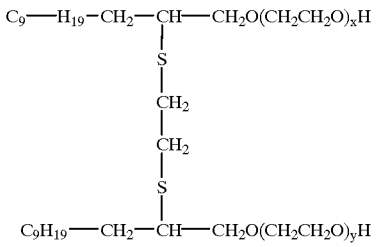

wherein x and y are whole numbers from 1 to about 22.

4. A surfactant blend comprising the compounds of claim 3 and one or more additional compounds selected from the group consisting of anionic surfactants, nonionic surfactants, cationic surfactants, amphoteric surfactants, and mixtures thereof.

5. The surfactant compound or composition of claim 1 further comprising the structure:

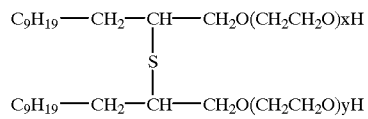

wherein x and y are whole numbers of from about 1 to 22.

6. A surfactant blend comprising the compounds of claim 5 and one or more additional compounds selected from the group consisting of anionic surfactants, nonionic surfactants, cationic surfactants, amphoteric surfactants, and mixtures thereof.

* * * * *